(12) United States Patent
Fredlund et al.

(10) Patent No.: US 6,292,219 B1
(45) Date of Patent: *Sep. 18, 2001

(54) MOTION PROCESSING SYSTEM USING AN EFFECTS-ENHANCED MOTION STORAGE MEDIUM

(75) Inventors: John R. Fredlund; Kenneth A. Parulski, both of Rochester, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,272

(22) Filed: Mar. 18, 1997

(51) Int. Cl.[7] .............................. H04N 5/262; H04N 9/74
(52) U.S. Cl. ............................................. 348/239; 348/578
(58) Field of Search ...................................... 348/231, 239, 348/578, 595, 594, 593, 597; 352/48, 50, 85; 386/52, 53

(56) References Cited

U.S. PATENT DOCUMENTS

| | | | |
|---|---|---|---|
| 5,003,404 | * 3/1991 | Yoshimura et al. | 348/239 |
| 5,119,080 | 6/1992 | Kajimoto et al. | 340/723 |
| 5,231,512 | * 7/1993 | Ebihara et al. | 386/64 |
| 5,264,933 | 11/1993 | Rosser et al. | 358/183 |
| 5,301,026 | 4/1994 | Lee | 348/584 |
| 5,355,173 | 10/1994 | Fujita | 348/590 |
| 5,477,264 | 12/1995 | Sarbadhikari et al. | 348/231 |
| 5,633,678 | * 5/1997 | Paruski et al. | 348/231 |
| 5,657,094 | * 8/1997 | Moriwake | 348/578 |
| 5,786,864 | * 7/1998 | Yamamoto | 348/578 |
| 5,798,800 | * 8/1998 | Nonaka | 348/578 |

OTHER PUBLICATIONS

"Video Demystified: A Handbook for the Digital Engineer" by Keith Jack, 2nd ed. HighText Interactive, Inc., 1996.

"Avid Field Systems" product specifications.

* cited by examiner

Primary Examiner—Wendy R. Garber
Assistant Examiner—Luong Nguyen
(74) Attorney, Agent, or Firm—David M. Woods (57) ABSTRACT

A motion image processing system applies special effects to a motion image recorded on a motion storage medium by utilizing other data that is also recorded on the motion storage medium. In particular, the motion image processing system includes a structure for generating a digital image signal stream; an arrangement for accessing the other data recorded on the motion storage medium, where the other data comprises prerecorded information for generating at least one special effect in conjunction with the recorded images; a signal processing section for applying the special effect to the digital image signal stream; and a structure for loading the signal processing section with the prerecorded information on the motion recording medium in order to generate the special effect. By thus providing the motion recording medium with pre-recorded imagery and/or data which interacts with the user-captured video stream, it is possible to provide a more appealing "edited" video stream that would be difficult or impossible to achieve without extensive editing equipment.

43 Claims, 9 Drawing Sheets

MOTION PROCESSING SYSTEM USING AN EFFECTS-ENHANCED MOTION STORAGE MEDIUM

FIELD OF THE INVENTION

The invention relates generally to the field of photography, and in particular to motion photography. More specifically, the invention relates to a digital motion processing system useful with image capture and playback systems.

BACKGROUND OF THE INVENTION

For many reasons, consumer captured video programs are often boring to view, compared to professionally-captured programs. Among these reasons are unprofessional scene changes, and "unmodifiable" camera capture operations. In present motion imaging systems, the image capture media exists essentially for storage of captured sound and images. For example, analog video tape-based camcorders capture sound and images and store them on a video tape at video rates. Consequently, the video tape is used merely to record the vast amount of sound and images that constitute the video signal stream.

Even in more recent digital video tape systems, the image capture media is used only for recording the data which constitutes the video stream. The tape cassette may include a provision for a separate solid state memory, but that memory is not used to capture the continuous video stream. Its purpose, to date, is to index and categorize the video stream recorded on the tape.

In connection with electronic still imaging systems, as described in U.S. Pat. No. 5,477,264, it is known to capture and store images in a removable still image storage device, which is also loaded with enhancement files for effecting the operation of the system. A type of enhancement file contained in the still image storage device comprises pre-existing image data files, i.e., files with images not captured by the camera system. Such files are accompanied by code which instructs the camera on how to merge the pre-existing image files with those captured by the camera. In this manner graphic overlays and text can be superimposed on the captured still images by the camera to generate, e.g., a birthday message superimposed over the captured image. Proper execution of such a feature might include a user interface for selection of pre-existing image and overlay combinations, and also a viewfinder which helps the user to compose the captured image so as to complement the selected overlay.

To date, however, in motion capture systems, pre-recorded data is not used to enhance and improve the quality of content of the consumer-captured motion video content. While clearly the same video tape could be pre-recorded with material recorded from broadcast TV or other professional sources, these two types of video streams (consumer and professional) would remain separate and distinct on the capture medium, and do not act upon each other. It would be desirable to have a simple way, at least for the user, to achieve professional caliber in amateur motion video sequences, particular at the transition between scenes.

SUMMARY OF THE INVENTION

The present invention is directed to overcoming one or more of the problems set forth above. Briefly summarized, according to one aspect of the present invention, a motion image processing system applies special effects to a motion image recorded on a motion storage medium by utilizing other data that is also recorded on the motion storage medium. In particular, the motion image processing system includes means for generating a digital image signal stream; means for accessing the other data recorded on the motion storage medium, where the other data comprises prerecorded information for generating at least one special effect in conjunction with the recorded images; a signal processing section for applying the special effect to the digital image signal stream; and means for loading the signal processing section with the prerecorded information on the motion recording medium in order to generate the special effect.

By providing the motion recording medium with prerecorded imagery and/or data which interacts with the user-captured video stream, it is technically feasible to provide a more appealing "edited" video stream that would be difficult or impossible to achieve without extensive editing equipment. Consequently, a camcorder or other playback and recording devices may use the pre-recorded imagery and/or data to act upon the user captured video stream and achieve a professional caliber video product.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because motion imaging systems and devices are well known, the present description will be directed in particular to elements forming part of, or cooperating more directly with, apparatus in accordance with the present invention. Elements not specifically shown or described herein may be selected from those known in the art. Some aspects of the present description may be implemented in software. Unless otherwise specified, all software implementation is conventional and within the ordinary skill in the programming arts.

Figure 1:
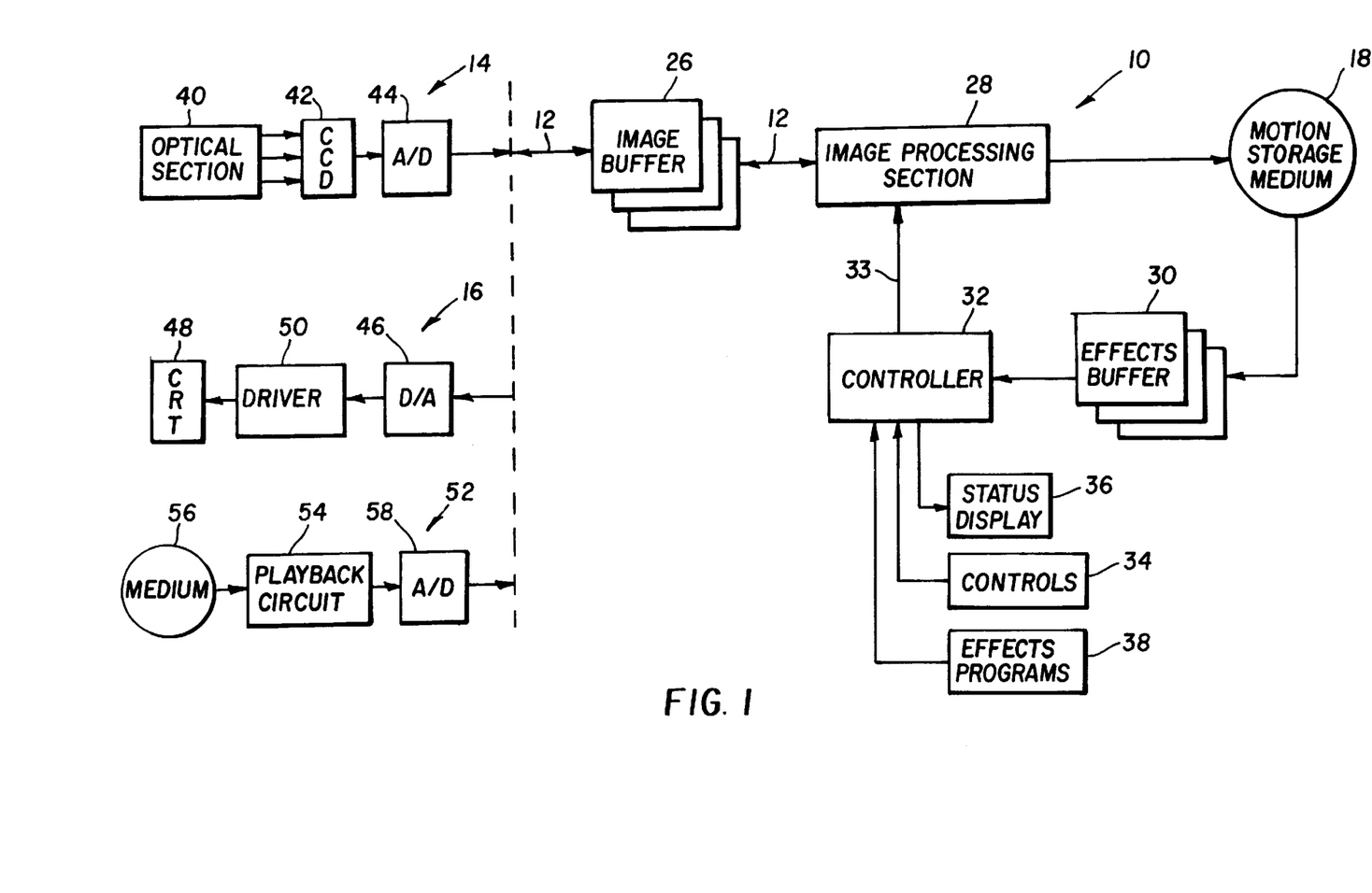
FIG. 1 is a block diagram of one embodiment of a motion imaging system according to the invention.
Figure 2:
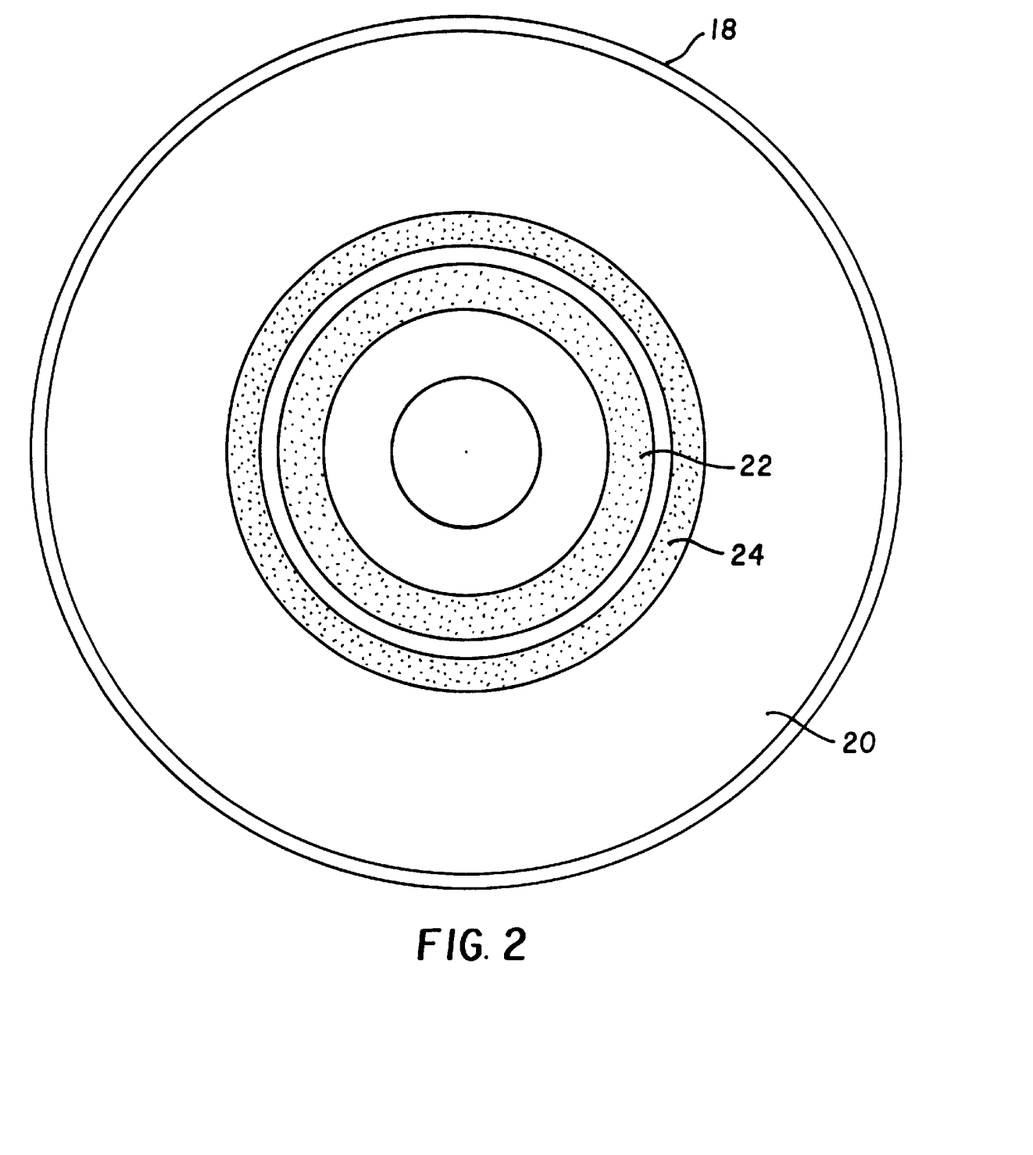
FIG. 2 is a diagram showing a random access motion storage medium.

Referring initially to FIG. 1, a motion imaging system comprises a motion processing section 10 for processing a digital image signal stream 12 either originating from a motion capture apparatus 14 or a motion playback apparatus 52, or applied to a motion display apparatus 16. The motion processing section 10 interfaces with a motion storage medium 18 having a region for storing motion images and a further region for storing one or more pre-recorded video effects, or data useful in generating one or more video effects, that are used in conjunction with the recorded images. The motion storage medium 18 may be, e.g., a magnetic tape or an optical medium. A typical optical motion storage medium is shown in FIG. 2, and includes a user recorded video sector 20, a data sector 22, and a sector 24 for pre-recorded video effects.

As shown in FIG. 1, the motion processing section 10 in combination with the motion capture apparatus 14 constitutes a video motion camera, such as a camcorder, and the motion processing section 10 in combination with the motion playback apparatus 52 constitutes a video player. The motion display apparatus 16 may be the viewfinding system of a camcorder or part of a separate player/recorder system. The motion processing section 10 further includes a set of image buffers 26 and an image processing section 28, both operative upon the digital image signal stream 12. The pre-recorded effects, or data corresponding thereto, are buffered in a set of effects buffers 30, and a controller 32 applies selected effects from the buffers 30 to the image processing section 28 via a special effects video stream 33. The application of the effects is controlled either from a user interface comprising a set of control buttons 34 and a status display 36, or from a program downloaded from an effects program memory 38. The effects program memory 38 could be loaded with data from the motion storage medium 18, or the data could be resident in the memory 38.

The motion capture apparatus 14 includes an optical section 40 for directing image light toward an image sensor 42, such as a charge-coupled device (CCD). An image signal generated by the image sensor 42 is converted into a digital image signal by an analog-to-digital (A/D) converter 44 and applied to the motion processing section 10. The motion display apparatus 16 includes a digital-to-analog (D/A) converter 46 for converting the digital image signal stream 12 into an analog signal suitable for driving a display, such as a cathode ray tube (CRT) display 48. A driver 50 processes the analog signal, e.g., adding the synchronization necessary to drive the CRT display 48. Accordingly, the motion processing section 10 may apply the pre-recorded special effect to the digital image signal stream 12 during recording of the image signal on the motion storage medium 18 subsequent to image capture, or may apply the pre-recorded special effect to the digital image signal stream 12 during display of the image signal from the motion storage medium 18. Thus, the motion processing section may be part of a camera or part of a display unit.

As further shown in FIG. 1, the motion imaging system includes a motion playback apparatus 52, which includes a playback circuit 54 for reproducing motion images from a motion playback medium 56. The motion images are converted into a digital signal by an A/D converter 58, and provided to motion processing section 10. The motion processing section 10 then functions either as a player or as a recorder. As a player, the effects stored on the motion storage medium 18 are combined with the playback image signal from the motion playback medium 56 in the image processing section 28, and then applied to the motion display apparatus 16 for viewing on the CRT display 48. In this manner, the effects are applied during playback and displayed, but not stored with the motion images. As a recorder, the effects stored on the motion storage medium 18 are combined with the playback image signal from the motion playback medium 56 and stored on the motion storage medium 18. In this manner, the effects are applied during playback and stored with the motion sequences. Note that the playback medium 56 could be digital media, and then the A/D converter 58 would not be required.

During operation of the motion capture apparatus 14, motion images are stored in the set of image buffers 26, and provided to the signal processing section 28. Either before or after capture, the pre-recorded effects are read from the motion storage medium 18 and stored in the set of effects buffers 30. One or more selected effects are then loaded into the image processing section 28 by the controller 32, according to instructions from the set of user controls 34 or from the automatic effects program memory 38, which automatically implements an effect pursuant to a predetermined event (such as the end of a scene). Alternatively, the pre-recorded portion of the recording media can include the program for implementing the effect. Where a user is presented with the choice of a number of possible effects, the status display 36 is used to display the choices and to accomplish the selection process. The image processing section 28 then applies the effect to the digital image signal stream 12, and the processed image signal with its appended effect is stored in the motion storage medium 18.

The motion imaging system shown in FIG. 1 is capable of determining the presence of pre-recorded video and/or pre-stored data on the image storage medium 18. For instance, flag bits can be set in an image header to indicate the presence of one or more effects. When the controller 32, e.g., reads the header and detects the pre-recorded video and/or data, it applies the video and/or data to the image processing section 28 to modify the user captured (or played back) video. The pre-recorded video and/or data may contain user interface instructions, particularly if the image storage medium 18 contains a plurality of potentially useful effects such as a choice of different transitions (segue types) from one scene to another.

Upon detecting the pre-recorded information, therefore, the controller 32 first determines if the pre-recorded information dictates notifying the user that selections are necessary (such as selection of segue types). If user selection is required, the controller 32 will identify the selections on the status display 36 and the user will enter the selection via the control buttons 34. If user selection is not required and the motion storage medium 18 includes program data for applying the effect, the motion imaging system will automatically act upon the video stream as the pre-stored program data from the storage medium instructs. In the absence of such program data, the motion imaging system utilizes prestored effects programs stored in the effects program memory 38 (such as inserting pre-recorded snippets at scene breaks, or referencing such snippets pre-recorded on the storage medium 18 so that the playback by the camera or the player/recorder seamlessly includes that snippet).

Figure 3:
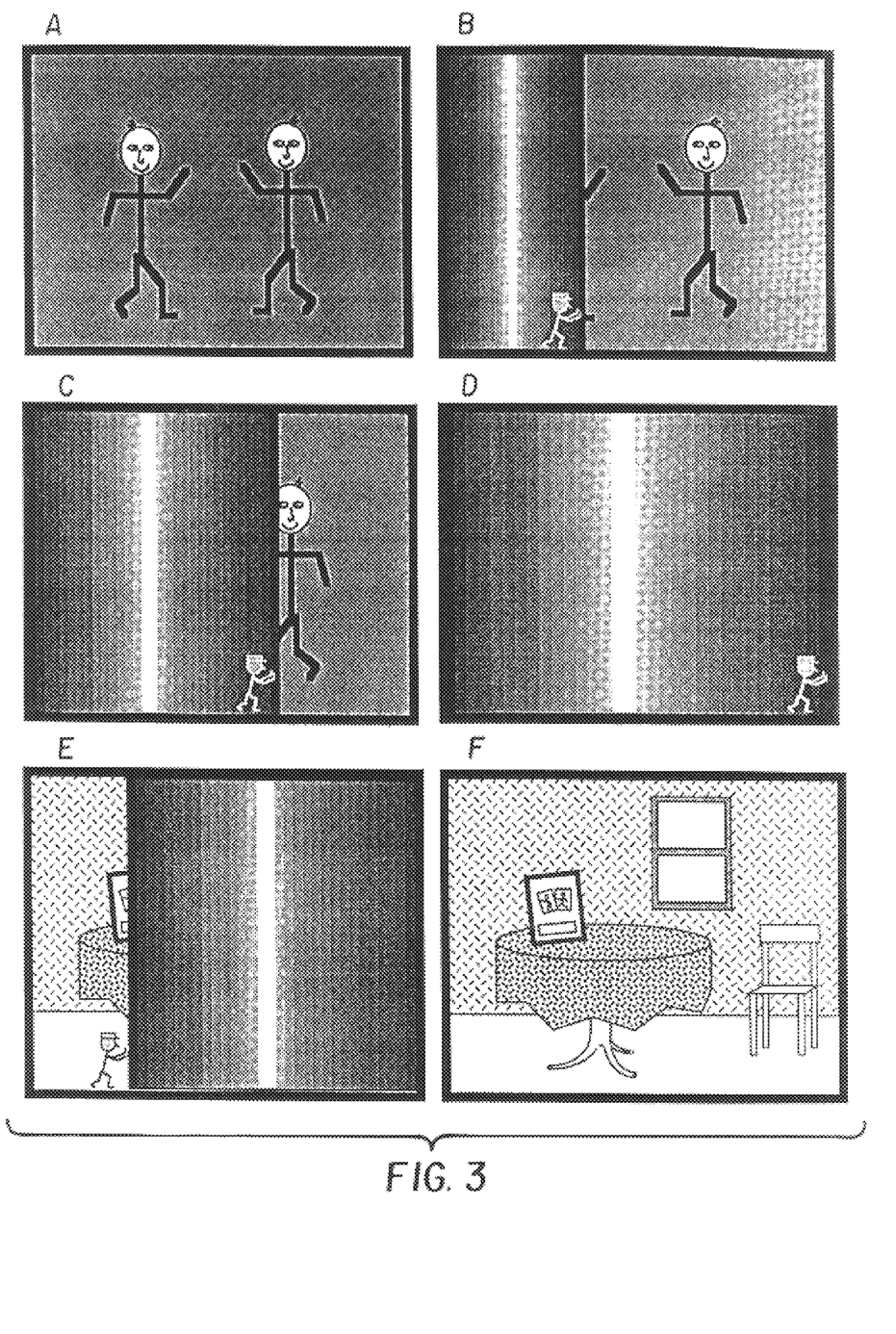
FIG. 3 is a diagram of several frames A–F showing a scene change effect using a cartoon character.
Figure 4:
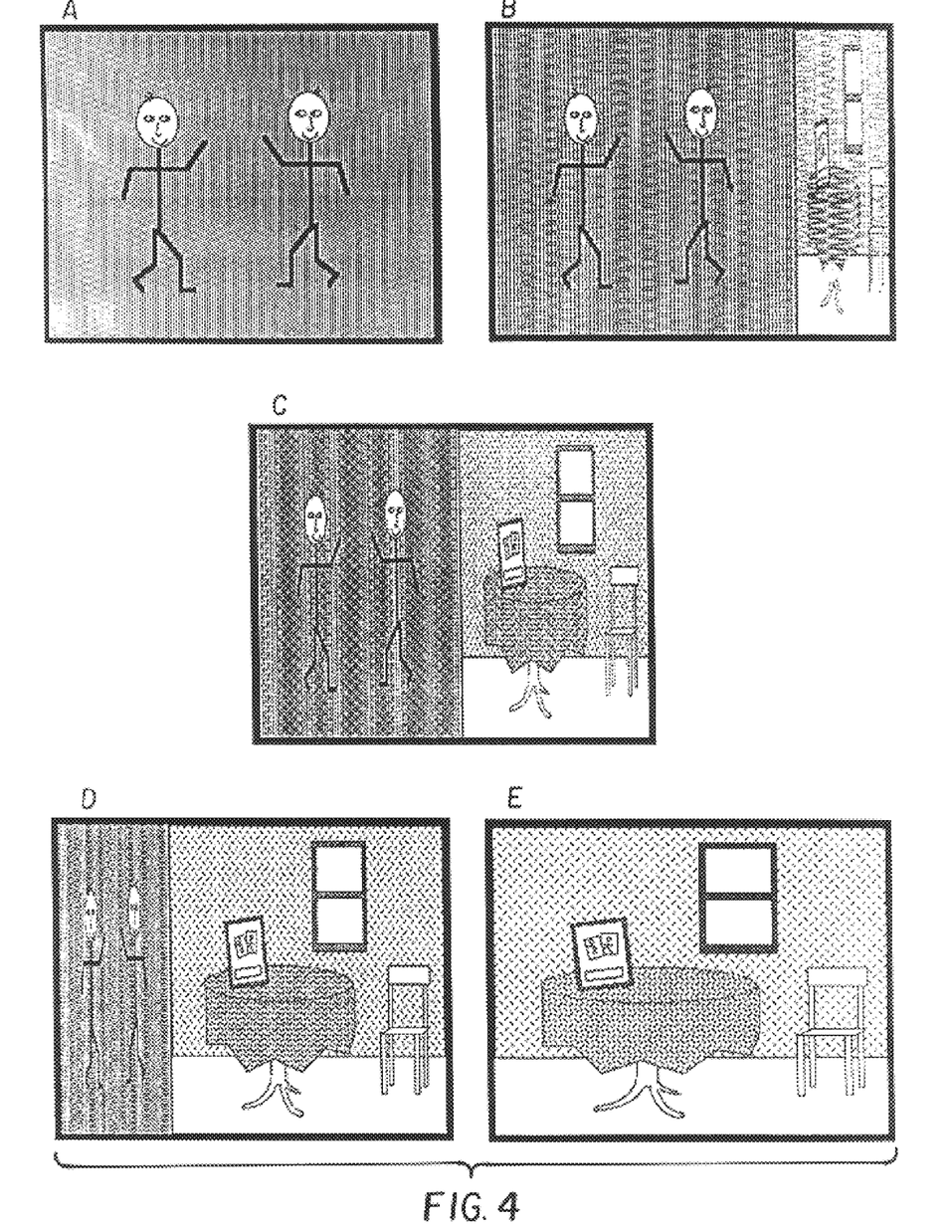
FIG. 4 is a diagram of several frames A–E showing a scene change effect using image distortion.
Figure 5:
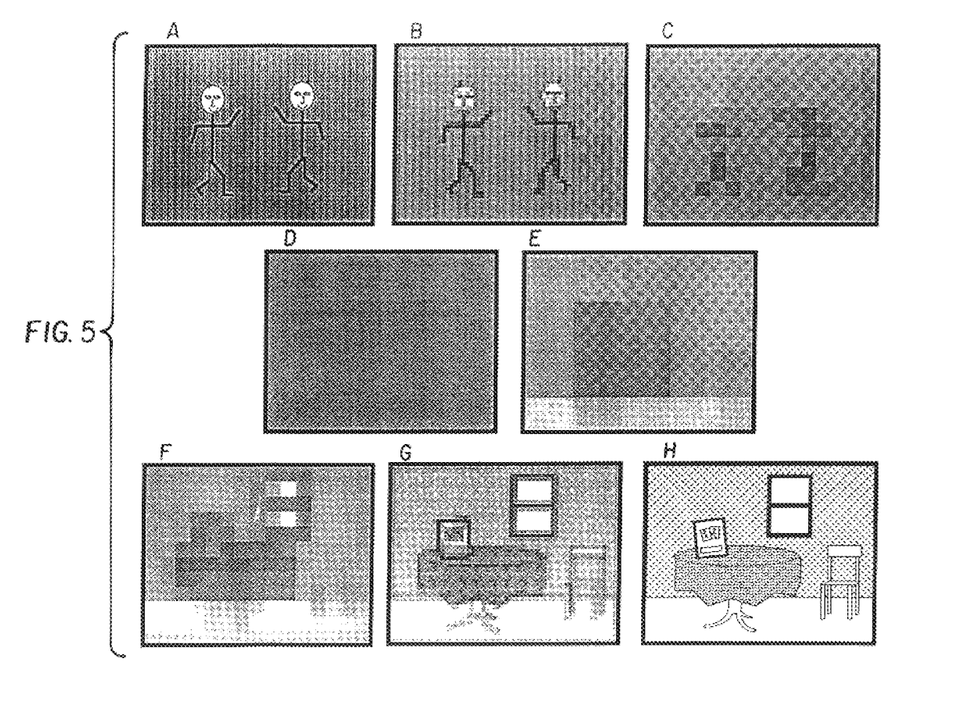
FIG. 5 is a diagram of several frames A–H showing a scene change effect using image fragmentation.

In practice, the motion imaging system may act as a traditional video camcorder until the user initiates a scene change (stops recording). At this point, the camera will insert a short snippet of video and audio to make a "bridge" from the just recorded scene to the next. This snippet may take a variety of forms, a few of which are shown in FIGS. 3–5. As shown in the sequence of frames A–F in FIG. 3, this snippet could be constituted of the added motion video of a cartoon character pulling a curtain (frames B–D) across the frozen last frame A of the captured sequence. A more complicated effect could be employed, such as a distortion sequence shown in frames A–E of FIG. 4 wherein the frozen last frame A is gradually squeezed out of the image (frames B–D), or a fragmentation sequence shown in frames A–H of FIG. 5 wherein the frozen last frame A is gradually transformed into continually enlarging fragments (frames B–E) until it disappears from the image. Upon initiating the recording of the next scene, the effect is completed as the cartoon character unveils the motion video of the new scene in frames E–F of FIG. 3, the new scene is stretched to fill the picture in frames B–E of FIG. 4, or the fragmentation is reversed and the new scene comes into focus in frames E–H of FIG. 5.

Figure 6:
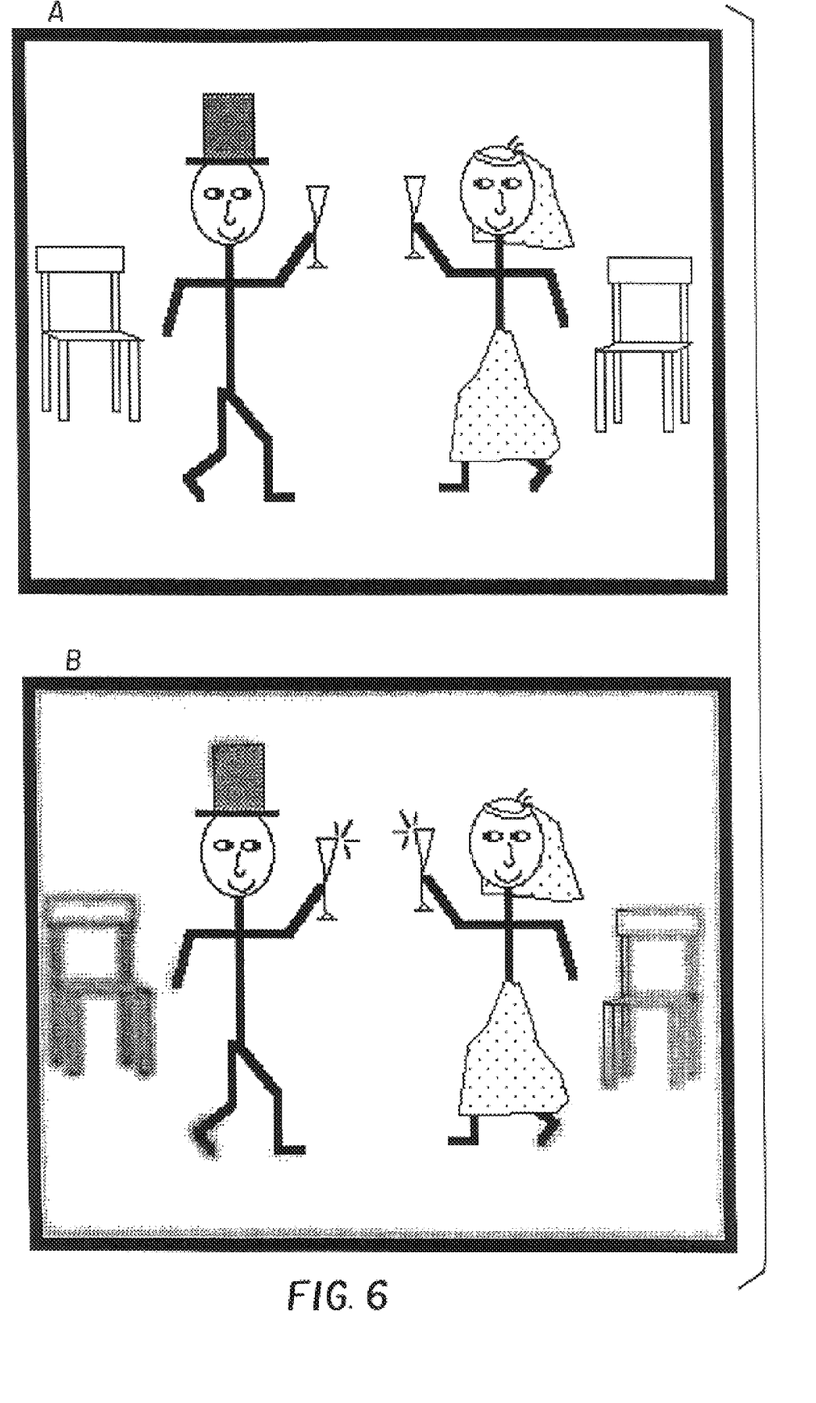
FIG. 6 is a diagram of two frames A–B showing a portrait effect

Other than segueing from one scene to the next scene, another effect the pre-stored data may have when acting upon the captured video is to change the manner in which the camera acts upon capturing the image, or the manner in which it is played back. For example, as shown in FIG. 6 in the differences between a "before" frame A and an "after" frame B, if a "wedding portrait" mode was read from pre-recorded data on the motion storage medium 18, the pre-recorded data might instruct the camera to soften focus by control of the optical section 40, or the image processing section 28 in the player/recorder might provide distortion at the outer edges of the frame and the highlights might be made to sparkle (as shown in frame B).

Figure 7:
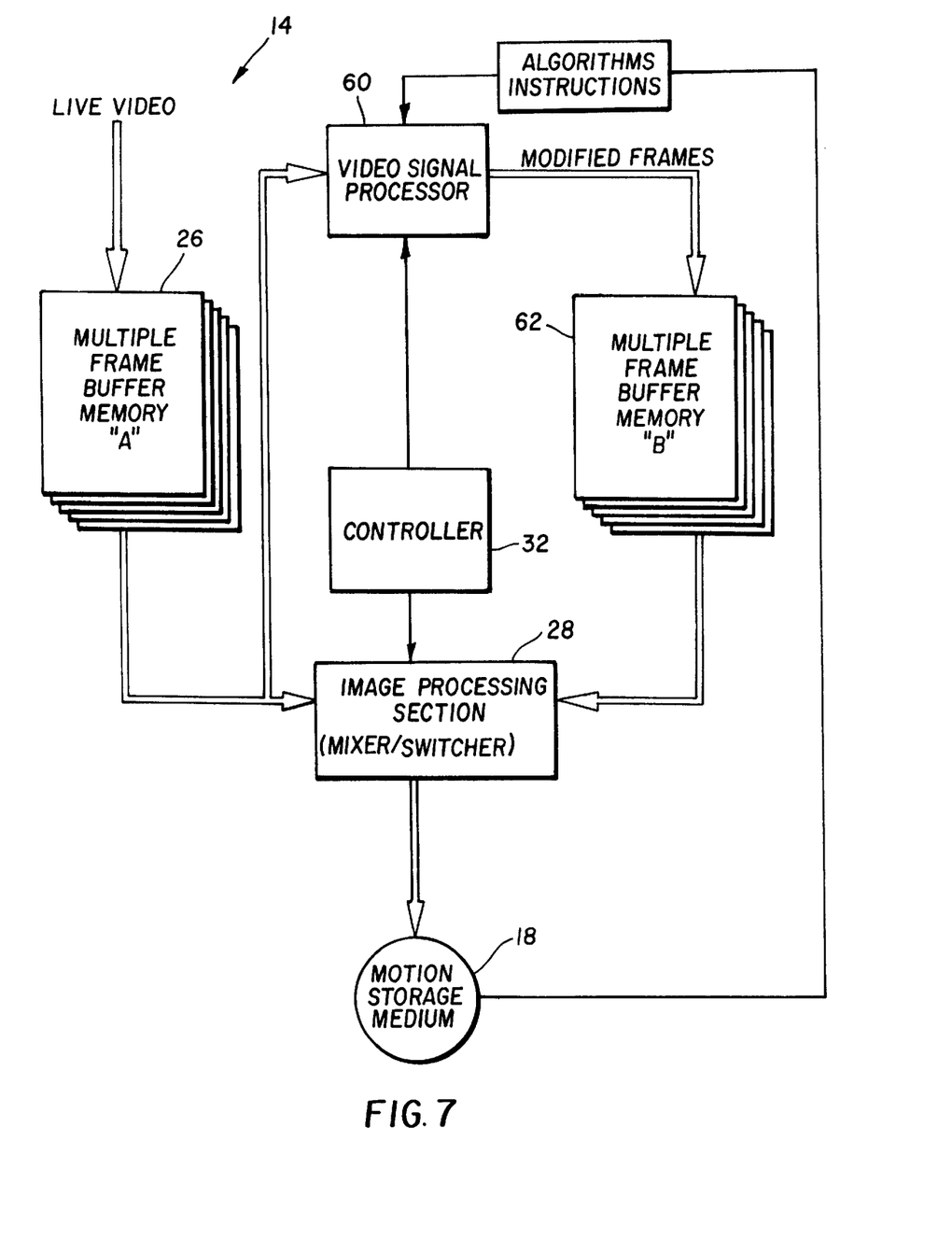
FIG. 7 is a block diagram of an alternative arrangement for the buffer memories shown in FIG. 1.

Referring to FIG. 1, the motion imaging system acts on the digital image stream and the effects data as it is recorded to provide the effects seen in FIGS. 3–6 through buffer memories 26 and 30. If the user captured video is buffered in the set of frame stores 26, and likewise the effect or segue in a second buffer 30, the effect can be applied at any time to the recorded digital image signal stream. Either the camera can switch from one buffer to the other as it records, or there can be merger of the two video streams to create an effect. In addition, as shown in FIG. 7, the buffers can be used to store modified frames which have been acted upon by the camera on the basis of instructions or algorithms pre-recorded on the motion storage medium 18. Algorithms or instructions from the motion storage medium 18 are applied to a video signal processor 60, where they are used to modify motion images stored in the image buffers 26 to produce the desire effect. The modified images are then stored in a frame buffer memory 62, and then mixed or switched with the motion images from the image buffers 26 and stored on the motion storage medium 18 as a modified motion image sequence.

If the image storage medium is random access, as shown in FIG. 2, improvement of the user-captured video is facilitated. In this case, any snippets of video or effects which are pre-recorded need only be referenced at the point in the recording at which they are desired, and the playback mechanism can seek out the required video or data necessary from the other portion of the medium. Alternately, the segues and/or effects can be automatically applied without a recorded reference (such as an address of the data). In this case, the motion processing section 10 is contained within the playback mechanism.

Although the effects and segues might also be implemented by the camera alone, having the effects images and effects data on the medium is preferred because more options may be stored and selected. Consequently, the expense of storing such effects images and effects data is not borne by the camera. Also, if the medium is write-once or if erasable optical discs are used to record user-captured material from a camcorder, the disc would be supplied with some portion of pre-recorded effects/segues (which could be pressed sections to reduce the manufacturing cost of supplying these segments) and the creation of the "edited" video stream could occur in an editor, disc recorder, or computer, rather than in a camcorder. For instance, the motion playback apparatus 52 and the motion processing section 10 shown in FIG. 1 could be embodied as a video editor, or as an effects program in a computer.

Figure 8A:
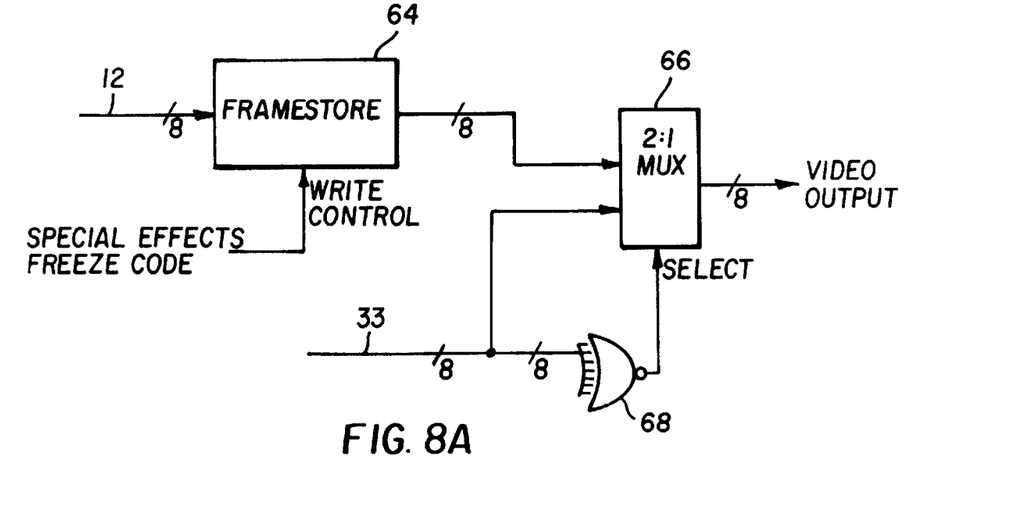
FIG. 8 is a diagram of a digital circuit for implementing a simple effect.
Figure 8B:
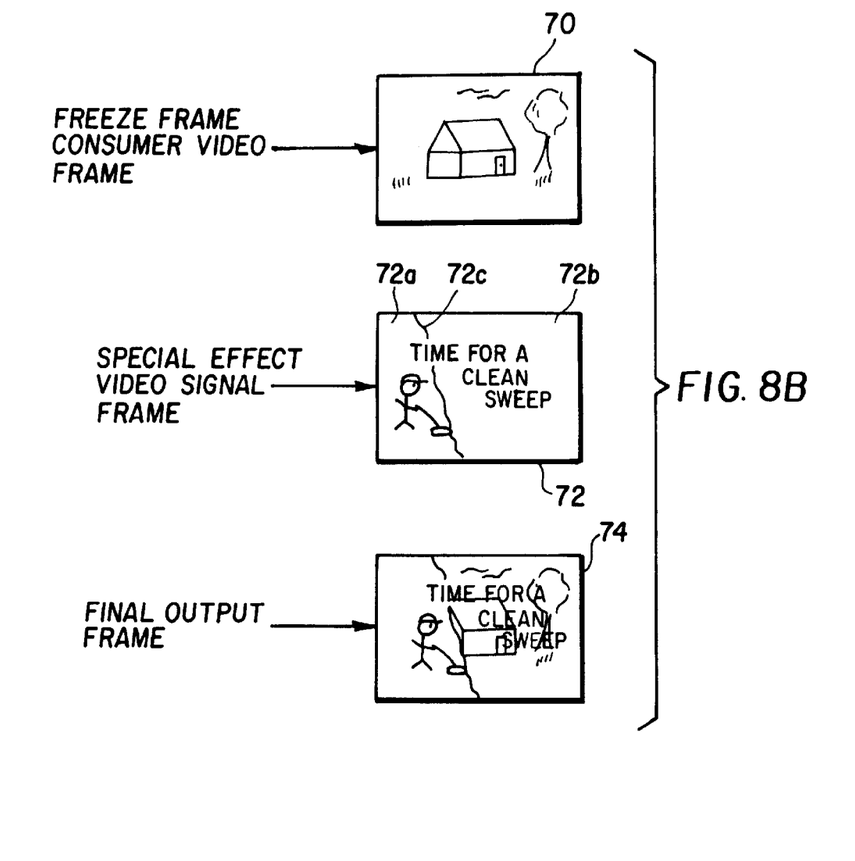

FIGS. 8A and 8B show a circuit embodiment of the image processing section 28 for implementing a simple effect, such as the scene change shown in FIG. 3, and examples of the image frames at different points in the circuit as the effect is processed. The circuit embodiment includes a framestore 64 connected to receive a consumer video signal through the digital image signal stream 12, and to apply the signal pursuant to a special effects freeze code to a multiplexer 66. The special effects video stream 33 is applied to the input of the multiplexer 66 and, through a NOR gate 68, to a select terminal of the multiplexer 66. In operation, a transition frame 70 is repeatedly supplied to the multiplexer 66 (i.e., frozen) by application of a special effects freeze code to the frame store 64. Concurrently, a series of special effects frames 72 are applied to the multiplexer 66 and the NOR gate 68. Each special effects frame 72 has an effects area 72a (where its code value is non-zero) and a print-through area 72b (where the code value=0), as well as a transition 72c between the two areas which advances over the image from one frame to the next. The code values for each image pixel location form the select control for the multiplexer 66. When the code value is zero, the multiplexer 66 selects the corresponding portion of the frozen frame 70; otherwise, the multiplexer 66 selects the corresponding portion of the special effects frame 72. In this manner, an output frame 74 is generated that is a composite of the frozen transition frame 70 and the special effects frame 72. Since the sequence of special effects frames 72 has a transition line 72c that advances left to right across the frame, the result is a series of output frames 74 in which the effect sweeps the captured image out of the frame.

Figure 9:
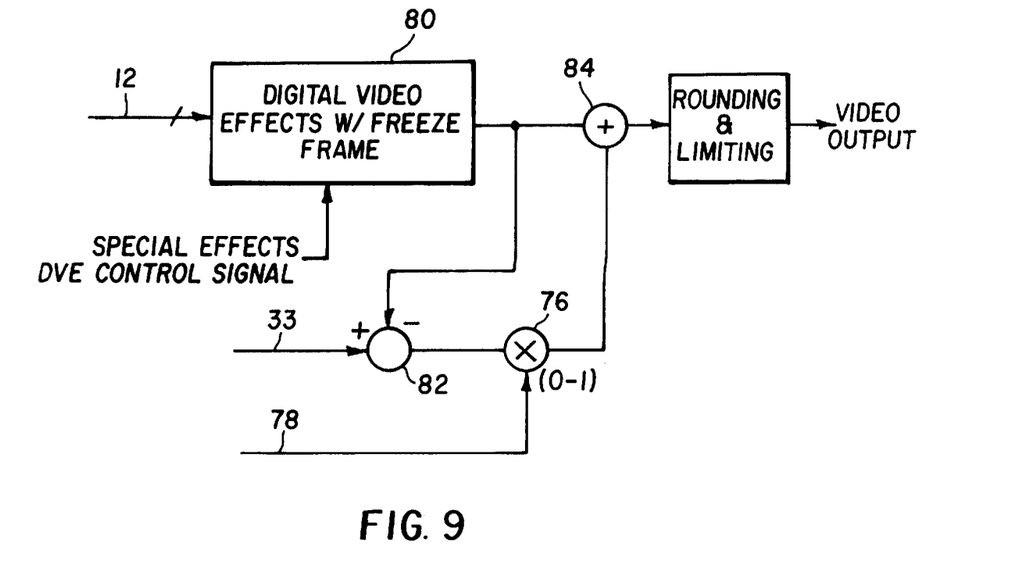
FIG. 9 is a diagram of a digital circuit for implementing an elaborate effect.

While FIG. 8A shows a circuit for selecting either the captured image or the special effects image for each point of the composite image, FIG. 9 shows a circuit for mixing the captured video signal and the special effects video signal to achieve a more elaborate effect, e.g., a cross fade between the two signals as seen in FIG. 5. The two channels, the captured video signal and the special effects video signal, are mixed using a single multiplier 76 and an alpha signal 78 that varies from 0–1 to control the multiplier 76. A frozen frame from a framestore 80 is subtracted from the special effects video signal in a subtractor 82, multiplied by the alpha signal in the multiplier 76, and added back to the captured video signal by an adder 84. Further information on such video mixing circuitry may be found in *Video Demystified: A Handbook for the Digital Engineer*, by Keith Jack, High Text Interactive, Inc., San Diego, Calif. 1996, pp. 394–413.

The invention has been described with reference to a preferred embodiment. However, it will be appreciated that variations and modifications can be effected by a person of ordinary skill in the art without departing from the scope of the invention.

PARTS LIST 10 motion processing section
12 digital image signal stream
14 motion capture apparatus
16 motion display apparatus
18 motion storage medium
20 user recorded video sector
22 data sector
24 pre-recorded video effects sector
26 image buffers 28 image processing section
30 effects buffers
32 controller
33 special effects video stream
34 control buttons
36 status display
38 effects program memory
40 optical section
42 image sensor
44 A/D converter
46 D/A converter
48 CRT display
50 driver
52 motion playback apparatus
54 playback circuit
56 motion medium
58 A/D converter
60 video signal processor
62 frame buffer memory
64 framestore
66 multiplexer
68 NOR gate
70 transition frame
72 special effects frame
72a effects area
72b print-through area
72c transistor line
74 output frame
76 multiplier
78 alpha signal
80 framestore
82 subtractor
84 adder

What is claimed is:

1. A motion image processing system for applying special effects to a motion image recorded on a motion storage medium, said medium further being capable of storing other data accessible to the motion image processing system, said system comprising:
   means for generating a digital image signal stream;
   means for accessing said other data stored on said motion storage medium, said other data comprising prerecorded information for generating at least one time-varying special effect in conjunction with the recorded images, the prerecorded information for generating the special effect comprising a series of special effect frames, wherein the special effect includes a short snippet of prerecorded video inserted between a last recorded scene image and a next image of a new scene to be recorded to provide a bridge between the scene images, the short snippet of prerecorded video comprising at least one non-blank video frame which does not include any portion of the last recorded scene image and does not include any portion of the next image of the new scene;
   a signal processing section for applying the series of special effect frames to the digital image signal stream to produce a series of output frames which include the special effect; and
   means for loading the signal processing section with the prerecorded information on the motion storage medium.

2. A motion image processing system as claimed in claim 1 wherein the motion storage medium includes a plurality of prerecorded special effects and the signal processing section includes user-actuated means for selecting a particular special effect.

3. A motion image processing system as claimed in claim 1 wherein the motion storage medium includes a predetermined special effect and the signal processing section includes means for automatically initiating the predetermined special effect.

4. A motion image processing system as claimed in claim 1 wherein the signal processing section includes buffer memory for storing prerecorded software for generating the special effects.

5. A motion image processing system as claimed in claim 1 wherein the motion storage medium is a magnetic tape including prerecorded software for generating special effects and the signal processing section includes means for reading the tape to select a particular special effect.

6. A motion image processing system as claimed in claim 1 wherein the motion storage medium is a random access storage including prerecorded software for generating special effects and the signal processing section includes means for reading the random access storage to select a particular special effect.

7. A motion image processing system as claimed in claim 1 wherein the signal processing section applies the special effect to the digital image signal stream during recording of the digital image signal stream on the motion storage medium.

8. A motion image processing system as claimed in claim 1 wherein the signal processing section applies the special effect to the digital image signal stream during playback of the digital image signal stream from the motion storage medium.

9. A motion camera for applying special effects to a motion image stored on a motion storage medium, said medium further being capable of storing other data accessible by the motion camera, said camera comprising:
   an image sensing section for capturing motion images and generating a digital image signal stream;
   means for accessing said other data stored on said motion storage medium, said other data comprising prerecorded software for generating at least one time-varying special effect from the stored images, the prerecorded software for generating the special effect comprising a series of special effect frames, wherein the special effect includes a short snippet of prerecorded video inserted between a last recorded scene image and a next image of a new scene to be recorded to provide a bridge between the scene images, the short snippet of prerecorded video comprising at least one non-blank video frame which does not include any portion of the last recorded scene image and does not include any portion of the next image of the new scene;
   a signal processing section for applying the series of special effect frames to the digital image signal stream to produce a series of output frames which include the special effect; and
   means for loading the signal processing section with the prerecorded software on the motion storage medium.

10. A motion camera as claimed in claim 9 wherein the motion storage medium includes a plurality of prerecorded special effects and the imaging apparatus includes user-actuated means for selecting a particular special effect.

11. A motion camera as claimed in claim 9 wherein the motion storage medium includes a predetermined special effect and the signal processing section includes means for automatically initiating the predetermined special effect.

12. A motion camera as claimed in claim 9 wherein the signal processing section includes buffer memory for storing the prerecorded software for generating the special effects.

13. A motion camera as claimed in claim 9 wherein the motion storage medium is a magnetic tape including the prerecorded software for generating special effects and the signal processing section includes means for reading the tape to select a particular special effect.

14. A motion camera as claimed in claim 9 wherein the motion storage medium is a random access storage including the prerecorded software for generating special effects and the signal processing section includes means for reading the random access storage to select a particular special effect.

15. A motion camera as claimed in claim 9 wherein the signal processing section applies the special effect to the digital image signal stream during recording of the digital image signal stream on the motion storage medium.

16. A motion camera as claimed in claim 9 wherein the signal processing section applies the special effect to the digital image signal stream during playback of the digital image signal stream from the motion storage medium.

17. A motion player for applying special effects to a motion image stored on a motion storage medium, said medium further capable of storing other data accessible by the motion player, said player comprising:
   an image reproduction section for reproducing captured motion images from the motion storage medium and generating a digital image signal stream;
   means for accessing said other data stored on said motion storage medium, said other data comprising prerecorded software for generating at least one time-varying special effect from the stored images, the prerecorded software for generating the special effect comprising a series of special effect frames, wherein the special effect includes a short snippet of prerecorded video inserted between a last recorded scene image and a next image of a new scene to be recorded to provide a bridge between the scene images, the short snippet of prerecorded video comprising at least one non-blank video frame which does not include any portion of the last recorded scene image and does not include any portion of the next image of the new scene;
   a signal processing section for applying the series of special effect frames to the digital image signal stream to produce a series of output frames which include the special effect; and
   means for loading the signal processing section with the prerecorded software on the motion storage medium.

18. A motion player as claimed in claim 17 wherein the motion storage medium includes a plurality of prerecorded special effects and the imaging apparatus includes user-actuated means for selecting a particular special effect.

19. A motion player as claimed in claim 17 wherein the motion storage medium includes a predetermined special effect and the signal processing section includes means for automatically initiating the predetermined special effect.

20. A motion player as claimed in claim 17 wherein the signal processing section includes buffer memory for storing the prerecorded software for generating the special effects.

21. A motion player as claimed in claim 17 wherein the motion storage medium is a magnetic tape including the prerecorded software for generating special effects and the signal processing section includes means for reading the tape to select a particular special effect.

22. A motion player as claimed in claim 17 wherein the motion storage medium is a random access storage including the prerecorded software for generating special effects and the signal processing section includes means for reading the random access storage to select a particular special effect.

23. A motion player as claimed in claim 17 wherein the signal processing section applies the special effect to the digital image signal stream during recording of the digital image signal stream on the motion storage medium.

24. A motion player as claimed in claim 17 wherein the signal processing section applies the special effect to the digital image signal stream during playback of the digital image signal stream from the motion storage medium.

25. A motion imaging system comprising:
   an electronic motion camera for capturing a sequence of motion images and storing the captured images; and
   a motion storage medium removable from the camera for storing the images captured by the camera, said medium capable of being prerecorded with software for generating time-varying special effects from the stored images, the prerecorded software for generating a given one of the special effects comprising a series of special effect frames, wherein the given special effect includes a short snippet of prerecorded video inserted between a last recorded scene image and a next image of a new scene to be recorded to provide a bride between the scene images, the short snippet of prerecorded video comprising at least one non-blank video frame which does not include any portion of the last recorded scene image and does not include any portion of the next image of the new scene, wherein said camera includes
   an optical section for generating the images;
   an image sensing section for electrically capturing the images provided by the optical section;
   a signal processing section for processing the electrically captured images, the signal processing section applying the series of special effects frames to the electrically captured images to produce a series of output frames which include the given special effect; and
   means for loading the signal processing section with the prerecorded software on the motion storage medium.

26. A motion imaging system as claimed in claim 25 wherein the motion storage medium includes a plurality of prerecorded special effects and the camera includes user-actuated means for selecting a particular special effect.

27. A motion imaging system as claimed in claim 25 wherein the motion storage medium includes a predetermined special effect and the camera includes means for automatically initiating the predetermined special effect.

28. A motion imaging system as claimed in claim 25 wherein the camera includes buffer memory for storing the prerecorded software.

29. A motion imaging system as claimed in claim 25 wherein the motion storage medium is a magnetic tape including the prerecorded software and the camera includes means for reading the tape to select a particular special effect.

30. A motion imaging system as claimed in claim 25 wherein the motion storage medium is a random access storage including the prerecorded software and the camera includes means for reading the random access storage to select a particular special effect.

31. A motion playback system utilizing an electronic motion camera for capturing a sequence of motion images and storing the captured images; and a motion storage medium removable from the camera for storing the images captured by the camera, said medium capable of being prerecorded with software for generating time-varying special effects from the stored images, the prerecorded software for generating a given one of the special effects comprising a series of special effect frames, wherein the given special effect includes a short snippet of prerecorded video inserted between a last recorded scene image and a next image of a new scene to be recorded to provide a bridge between the scene images, the short snippet of prerecorded video comprising at least one non-blank video frame which does not include any portion of the last recorded scene image and does not include any portion of the next image of the new scene, wherein said motion playback system includes a playback device, said playback device comprising;

an image playback section for electrically playing back the images stored on the motion storage medium;

a signal processing section for processing the electrically played back images, the signal processing section applying the series of special effects frames to the electrically played back images to produce a series of output frames which include the given special effect;

means for loading the signal processing section with the prerecorded software on the motion storage medium.

32. A motion playback system as claimed in claim 31 wherein the motion storage medium includes a plurality of prerecorded special effects and the playback device includes user-actuated means for selecting a particular special effect.

33. A motion playback system as claimed in claim 31 wherein the motion storage medium includes a predetermined special effect and the playback device includes means for automatically initiating the predetermined special effect.

34. A motion playback system as claimed in claim 31 wherein the playback device includes buffer memory for storing the prerecorded software.

35. A motion playback system as claimed in claim 31 wherein the motion storage medium is a magnetic tape including the prerecorded software and the playback device includes means for reading the tape to select a particular special effect.

36. A motion playback system as claimed in claim 31 wherein the motion storage medium is a random access storage including the prerecorded software and the playback device includes means for reading the random access storage to select a particular special effect.

37. A method for applying special effects to a motion image recorded on a motion storage medium, said medium further capable of storing other data, said method comprising the steps of:

generating a digital image signal stream;

accessing said other data stored on said motion storage medium, said other data comprising prerecorded information for generating at least one time-varying special effect in conjunction with the recorded images, the prerecorded information for generating the special effect comprising a series of special effect frames, wherein the special effect includes a short snippet of prerecorded video inserted between a last recorded scene image and a next image of a new scene to be recorded to provide a bride between the scene images, the short snippet of prerecorded video comprising at least one non-blank video frame which does not include any portion of the last recorded scene image and does not include any portion of the next image of the new scene; and     applying the series of special effect frames to the digital image signal stream in order to generate a series of output frames which include the special effect.

38. The motion image processing system of claim 1 wherein the snippet includes prerecorded video and a portion of the digital image signal stream.

39. The motion camera of claim 9 wherein the snippet includes prerecorded video and a portion of the digital image signal stream.

40. The motion player of claim 17 wherein the snippet includes prerecorded video and a portion of the digital image signal stream.

41. The motion imaging system of claim 25 wherein the snippet includes prerecorded video and a portion of a digital image signal stream corresponding to at least one of the captured images.

42. The motion playback system of claim 31 wherein the snippet includes prerecorded video and a portion of a digital image signal stream corresponding to at least one of the captured images.

43. The method of claim 37 wherein the snippet includes prerecorded video and a portion of the digital image signal stream.

\* \* \* \* \*